Sept. 13, 1932.   C. H. PHELPS   1,877,045
DEVICE FOR TESTING WHEEL ALIGNMENTS
Filed April 7, 1931
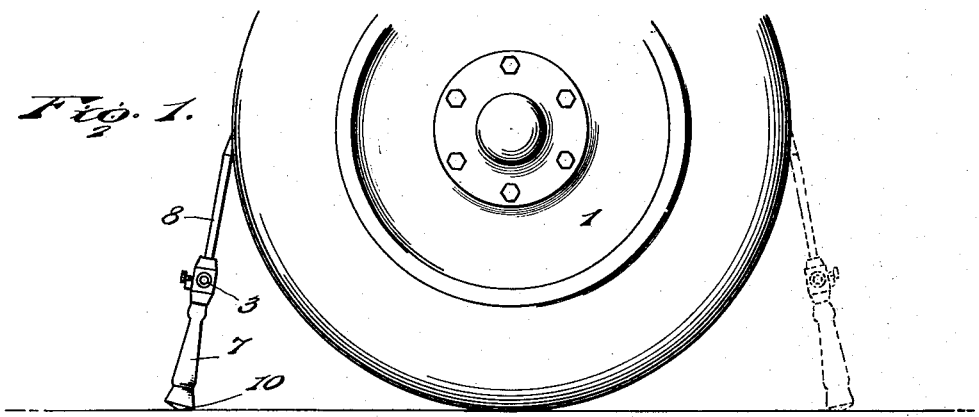
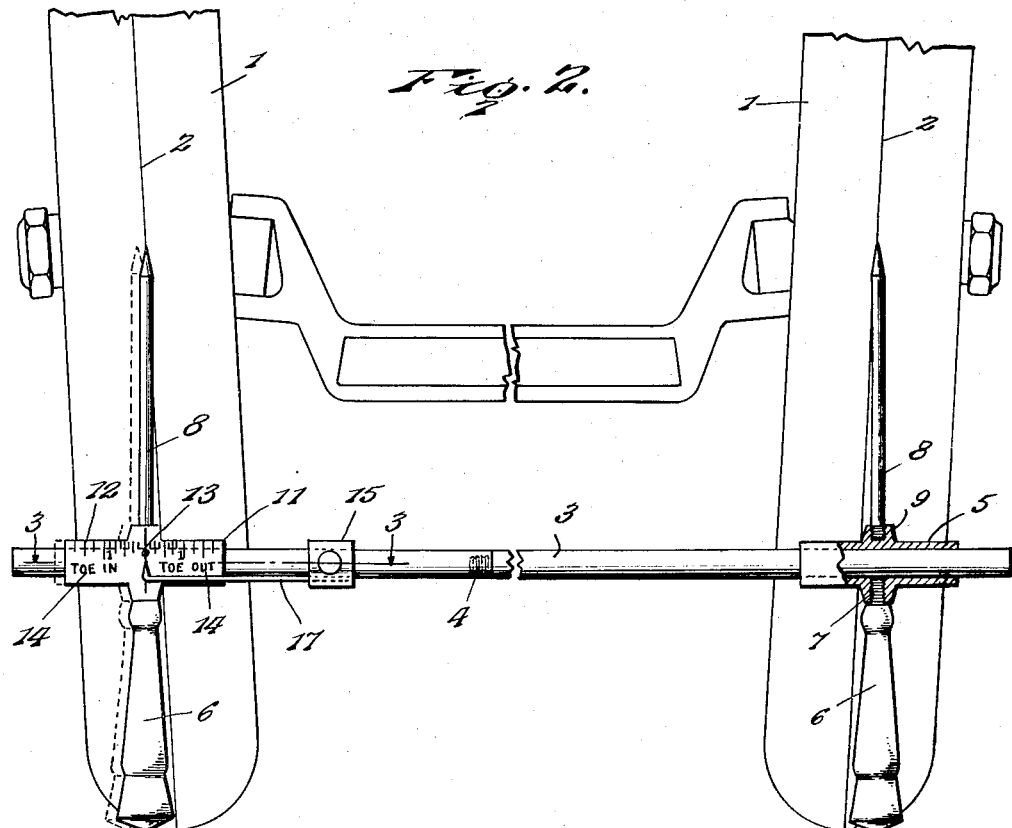
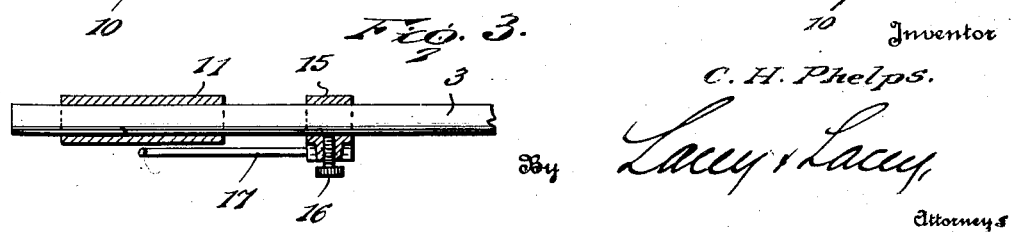

Patented Sept. 13, 1932

1,877,045

UNITED STATES PATENT OFFICE

CLYDE H. PHELPS, OF MOUNT VERNON, NEW YORK, ASSIGNOR TO RIESS MANUFAC-
TURING COMPANY, OF KOKOMO, INDIANA, A CORPORATION OF INDIANA

DEVICE FOR TESTING WHEEL ALIGNMENTS

Application filed April 7, 1931. Serial No. 528,385.

The object of this invention is to test the alignment of the front wheel of a vehicle. The invention provides an exceedingly simple and easily manipulated device whereby the alignment of wheels may be very readily ascertained and consists in novel features which will be hereinafter described and particularly defined.

In the annexed drawing

Figure 1 is an elevation of a portion of a vehicle wheel showing the tool applied thereto;

Fig. 2 is an enlarged front elevation, partly broken away and in section of the same; and Fig. 3 is a detail section on line 3—3 of Fig. 2.

The wheel illustrated is the front wheel of an automobile and may be of any well known or approved construction. In using the tool of the present invention each wheel 1 has a line, indicated at 2, marked thereon at a right angle to the axis of the wheel.

The tool comprises a bar or rod 3 which, to economize space in transportation or storage, may be formed in two parts connected by a threaded joint, as indicated at 4. Upon this rod at one end of the same is mounted a sleeve 5 which is held in a set position by a leg 6 threaded into the sleeve as shown at 7 with the threaded stud on the end of the leg adapted to bear against the rod 3 as will be noted. At a diametrically opposite point of the sleeve, a pointer or indicator 8 is threaded into a socket or boss 9 provided therefor on the sleeve and this pointer or indicator is aligned with the supporting leg, as shown in Fig. 1. The lower end of the leg 6 is beveled, as indicated at 10, so that when it is resting on the ground or on the floor of a garage or other place of use, with the tip of the pointer resting upon the gauge line 2 upon the wheel, the device will always form the same angle with respect to the wheel and the floor. Adjacent the opposite end of the rod 3 a second pointer or indicator 8 and leg 6 are provided and are connected with a sleeve 11 in the same manner as the first described leg and pointer are attached to the sleeve 5, the leg and pointer being duplicates in form and construction of those first described.

The sleeve 11 is provided on its front side with a scale, indicated at 12, with the zero point 13 at the center and aligned with the pointer and supporting leg as clearly shown. The graduations are to be read from the center toward either end and the sleeve bears the legends indicated at 14 reading "Toe out" and "Toe in". Adjacent the sleeve 11 and at the inner end thereof a nut 15 is mounted on the rod 3 and is equipped with a set screw 16 whereby it may be held in set position on the rod. Fixed to said nut 15 is a pointer 17 which extends in front of the sleeve 11 and has its terminal upturned and beveled so as to cooperate with the scale 12 and furnish a clear accurate reading.

In using the tool the legs 6 are set upon the floor or ground at the rear of the wheels with the pointer of the sleeve 5 bearing at its extremity upon the gauge line 2 of the adjacent wheel. The sleeve 11 is then slid along the rod 3 until the pointer thereon has its upper extremity resting on the gauge line 2 upon the respectively adjacent wheel whereupon the nut 15 is shifted so that the end of the pointer 17 will rest upon the zero portion of the scale 12. The nut is then locked in the position in which it may be then set and the tool is then brough around to the front of the wheel and set so that the pointer carried by the sleeve 5 will rest upon the guage line 2 of the adjacent wheel. If the alignment of the wheels is correct and true the pointer carried by the sleeve 11 will at the same time rest upon the gauge line 2 of the wheel to which it is presented. If, however, the wheels are out of alignment the last mentioned pointer will not rest upon the gauge line and may be in a position indicated by the dotted lines of Fig. 2, in which event the sleeve 11 is shifted to one side until the end of the indicator does rest on the gauge line, this shifting of the sleeve and the indicator on the same changing the relation of the pointer 17 to the scale and causing the pointer 17 to indicate by its new relation to the scale whether the wheel toes out or toes in and to what extent it does depart from true alignment.

The device is exceedingly simple and may be readily used in determining the alignment of wheels of any vehicle. When first applying the tool to the wheels, the sleeve 11 and the nut 15 may, of course, be easily shifted along the base rod 3 so that the distance between the two sleeves and indicator arms will conform to the width of the vehicle or the width of the wheels, thus accommodating the device to all vehicles.

Having thus described the invention, what is claimed is:

1. A tool for the purpose set forth comprising a bar, sleeves mounted upon said bar, means carried by the sleeves for supporting the bar adjacent the wheels of a vehicle, indicator arms carried by the sleeves to rest against the vehicle wheels, one of said sleeves having a scale thereon, and an indicator mounted on the bar adjacent said sleeve to cooperate with the scale thereon.

2. A tool for the purpose set forth comprising a bar, sleeves mounted on said bar in spaced relation, legs depending from said sleeves having their lower ends beveled whereby to form a predetermined angle with a ground line when the tool is in use, indicators rising from the sleeves in alignment with the respective legs, one of the sleeves having a scale thereon and bearing legends indicative of the direction in which the tested wheels fail to align, a nut mounted on the bar adjacent the last mentioned sleeve, and a pointer carried by the nut and cooperating with the scale upon said sleeves.

In testimony whereof I affix my signature.

CLYDE H. PHELPS. [L. S.]